United States Patent
Palsrok

(10) Patent No.: US 6,615,543 B1
(45) Date of Patent: Sep. 9, 2003

(54) PLANTER

(76) Inventor: Jeffrey J. Palsrok, 9095 Bluff Lake Dr., Zeeland, MI (US) 49464

(*) Notice: Subject to any disclaimer, the term of this patent is extended or adjusted under 35 U.S.C. 154(b) by 0 days.

(21) Appl. No.: 10/226,920

(22) Filed: Aug. 23, 2002

(51) Int. Cl.⁷ .............................................. A01G 25/00
(52) U.S. Cl. ........................................................ 47/86
(58) Field of Search ................................. 47/66.1, 66.3, 47/66.4, 66.7, 67, 81, 48.5; 248/206.2, 206.4

(56) References Cited

U.S. PATENT DOCUMENTS

| | | | |
|---|---|---|---|
| 33,774 A | 11/1861 | Chamberlain | |
| 112,433 A | 3/1871 | Eastman | |
| 738,301 A | * 9/1903 | Dowd | 220/486 |
| 792,542 A | * 6/1905 | McLeod | 47/11 |
| 879,613 A | 2/1908 | Edwards | |
| 2,152,456 A | * 3/1939 | Barrie | 220/487 |
| 2,770,220 A | * 11/1956 | Hyde | 119/60 |
| 2,799,972 A | 7/1957 | Teixeira | |
| 3,683,549 A | 8/1972 | Simmon | |
| 3,747,268 A | 7/1973 | Linder | |
| 4,062,148 A | * 12/1977 | Edmonds et al. | 47/76 |
| 4,250,664 A | * 2/1981 | Remke | 47/76 |
| 4,403,447 A | * 9/1983 | Braun | 47/76 |
| D278,521 S | 4/1985 | Baird et al. | |
| 4,561,208 A | * 12/1985 | Schultz | 47/83 |
| 4,604,825 A | * 8/1986 | Mainprice | 47/76 |
| D297,719 S | 9/1988 | Blaicher | |
| D297,822 S | 9/1988 | Blaicher | |
| 4,788,792 A | 12/1988 | Womick | |
| 4,847,741 A | * 7/1989 | Boettinger | 362/431 |
| D313,374 S | 1/1991 | Hartley | |
| D322,232 S | 12/1991 | Brinkerhoff | |
| 5,090,157 A | * 2/1992 | Sipala | 47/76 |
| 5,359,809 A | * 11/1994 | Johnson | 47/73 |
| D353,790 S | 12/1994 | Emalfarb et al. | |
| 5,454,191 A | 10/1995 | Mayeda et al. | |
| 5,481,826 A | 1/1996 | Dickinson et al. | |
| 5,502,924 A | * 4/1996 | Lee | 47/79 |
| D383,417 S | 9/1997 | Davis | |
| 5,664,367 A | 9/1997 | Huang | |
| D393,816 S | 4/1998 | Conner | |
| D409,520 S | 5/1999 | Conner | |
| 5,960,587 A | 10/1999 | Brasseur, Jr. et al. | |
| D416,214 S | 11/1999 | Conner | |
| 6,027,083 A | 2/2000 | Chang | |
| 6,044,585 A | 4/2000 | Carruth et al. | |
| 6,085,459 A | 7/2000 | Conner | |
| 6,098,337 A | * 8/2000 | Chen et al. | 47/62 A |
| 6,119,393 A | * 9/2000 | Wourms et al. | 47/39 |
| 6,161,333 A | 12/2000 | Poston | |
| 6,269,589 B1 | * 8/2001 | Bouler | 47/65.5 |
| 6,314,674 B1 | 11/2001 | Lee | |
| 6,381,902 B1 | * 5/2002 | Batshon | 47/86 |
| 6,499,429 B1 | * 12/2002 | Hein | 119/51.03 |
| 6,505,438 B1 | * 1/2003 | Hsia | 47/24.1 |

FOREIGN PATENT DOCUMENTS

GB    2212374 A    7/1989

* cited by examiner

Primary Examiner—Charles T. Jordan
Assistant Examiner—Jordan M Lofdahl
(74) Attorney, Agent, or Firm—Price Heneveld Cooper Dewitt & Litton

(57) ABSTRACT

A planter system includes a pair of C-shaped wire baskets held together with connecting rods. The rods are L-shaped, and rotate between a storage position tight against their respective basket, and a use position where they telescopingly engage tube sections on the mating basket. A base engages the bottom of each wire basket, and can be inverted between low and high basket supporting positions, with connectors on the basket snap-attaching or magnetically attaching to the base in both positions. One corner of the basket has a hook shaped to engage another corner of the basket, such that several baskets can be interconnected to form a ring or long chain. An arching handle is provided that pivots down for storage and pivots up to a use position where it overlappingly frictionally engages (or magnetically couples to) the handle of an adjacent identical basket.

29 Claims, 12 Drawing Sheets

PLANTER

BACKGROUND OF THE INVENTION

The present invention relates to planters used to hold potted plants, where the planter is configured to be used in different arrangements and configurations, and configured to be interconnected with other like planters.

Planters are commonly used in yards and homes to add character and beauty to homes, and to add a personal touch to home or business decor. However, it is not practical to purchase different planters for every different "look" and arrangement that is desired. Further, homeowners often are not sure of what they want until they experiment with different patterns and arrangements, and still further, changes are desired from time to time. Thus, a planter is desired that can be arranged in different ways to provide a multitude of different looks and to satisfy a variety of different needs.

Though flexibility is important, there are competing requirements. Planters must be easy to use and intuitive to assemble, since many homeowners are not interested in trying to follow complex directions. Planters should preferably have few (or no) small or loose pieces, since small and loose pieces get lost, creating difficulties for any individuals who sell, service, and use the products. The planters must be durable and-long lasting, and must be able to endure harsh outdoor weather, temperature extremes, and moisture.

Accordingly, a planter is desired having the aforementioned advantages and solving the aforementioned problems.

SUMMARY OF THE PRESENT INVENTION

The present invention includes a planter having a pair of wire baskets each with interconnected wire segments defining a wall, and each having a tube section attached to the wire segments near a top of the wall. Each of the pair of baskets has a rod telescopingly extending into the tube section of the other basket. A fastener is provided on the tube section for retaining the associated rod at a selected telescoped position to maintain a selected spacing of the pair of baskets.

In another aspect of the present invention, a planter includes a pair of plant holders each having a wall with a vertically-open area for receiving a post in a center of the wall, and each having a connector offset from the center of the wall. Each of the pair of plant holders has a rod offset from the center of the wall in a direction opposite the connector. A clamp is provided on one plant holder for clampingly retaining the rod from the other plant holder at a selected telescoped position to maintain a selected spacing of the pair of plant holders, with the rod associated with each of the plant holders being spaced from the rod associated with the other plant holder such that the pair of plant holders can be positioned around the post and also can be positioned on opposite sides of a railing.

In another aspect of the present invention, a planter includes a basket having first wire segments defining a bottom and defining a space for retaining a potted plant, and a concave base having second wire segments defining a support area. At least one connector is provided on the basket that is shaped to releasably engage the second wire segments and hold the bottom of the basket to the support area of the base both when the base is in a first position where the support area is adjacent a floor surface and also when the base is in an inverted second position where the support area is spaced above the floor surface.

In another aspect of the present invention, a planter system includes a plurality of identical planters each having a wall defining a space for holding a potted plant. The wall defines a geometric shape with first and second outer corners. The first outer corner has a first connector and the second outer corner has a second connector for receiving the first connector in an arrangement where the first outer corner of one planter is held closely adjacent to the second outer corner of another planter but where the interconnected first and second connectors permit a wide range of angles between the closely adjacent planters. By this arrangement, three or more of the planters can be interconnected to make rings and shapes around an obstacle. In one form, the first and second connectors are a hook and mating recess.

In another aspect of the present invention, a planter includes a planter having a wall defining an enclosed area for a plant. The planter further includes an L-shaped connector with a first leg coupled to the wall for rotation so that, as the first leg is rotated, a second leg is moved between a storage position where the second leg does not protrude from the planter, and an extended use position where the second leg extends away from the wall for connection to another planter.

In still another aspect of the present invention, a planter includes first and second baskets each having a flat wall defining a plane. The first and second baskets are shaped for positioning together to form an arrangement having the appearance of a single basket, and the first and second baskets have connectors for holding the first and second baskets together. The first basket has a first handle with first ends attached to the first basket and a first arching portion, and the second basket has a second handle with second ends attached to the second basket and a second arching portion. The first and second handles are each movable between a horizontal storage position perpendicular to the plane and an upright use position extending parallel the plane. The first and second arching portions have first and second bends, respectively, that extend non-parallel the plane and that overlap and frictionally engage when the first and second handles are in the use positions when the first and second baskets are connected together.

In yet another aspect of the present invention, a planter includes a basket having a flat wall. First connectors are provided on the flat wall for connecting the basket to a building wall, and second connectors are provided on the flat wall for connecting the basket to another identical basket with the flat wall abutting a flat wall on the identical basket, and still further third and fourth connectors are provided at ends of the flat wall for connecting the basket to other identical baskets to create a ring of interconnected planters.

In yet another aspect of the present invention, a planter design is believed to be novel, ornamental and unobvious, as shown in any of the figures.

These and other features, objects, and advantages of the present invention will become apparent to a person of ordinary skill upon reading the following description and claims together with reference to the accompanying drawings.

DETAILED DESCRIPTION OF THE PREFERRED EMBODIMENT

Figure 8:
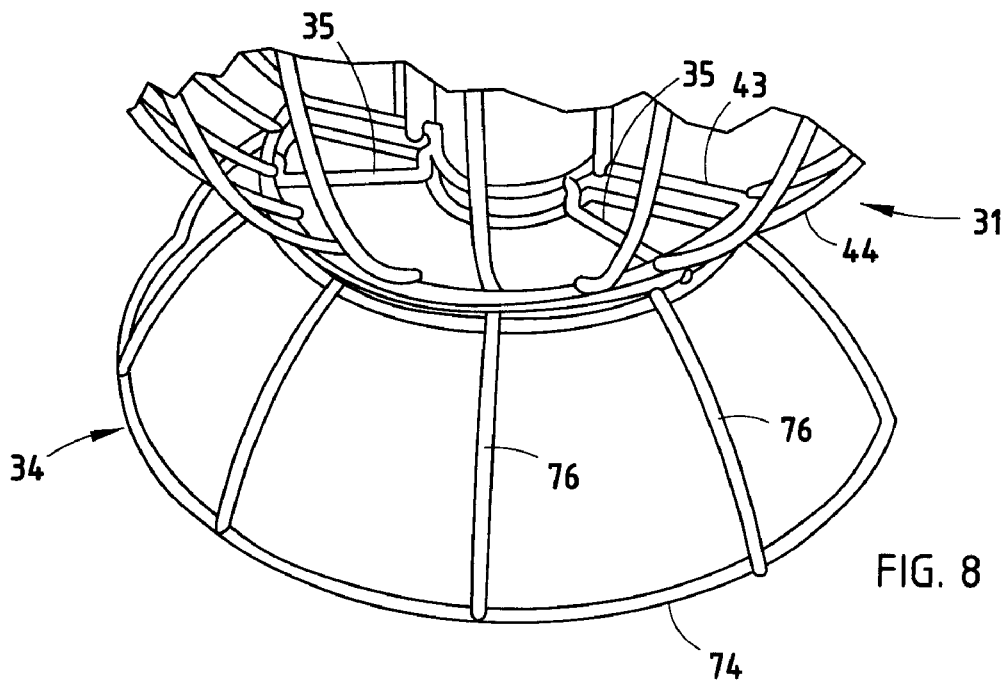
FIGS. 8 and 9 are bottom fragmentary perspective views of the base attached to the basket, the base in FIG. 8 holding the basket in a raised position and in FIG. 9 holding the basket in a lowered position.
Figure 9:
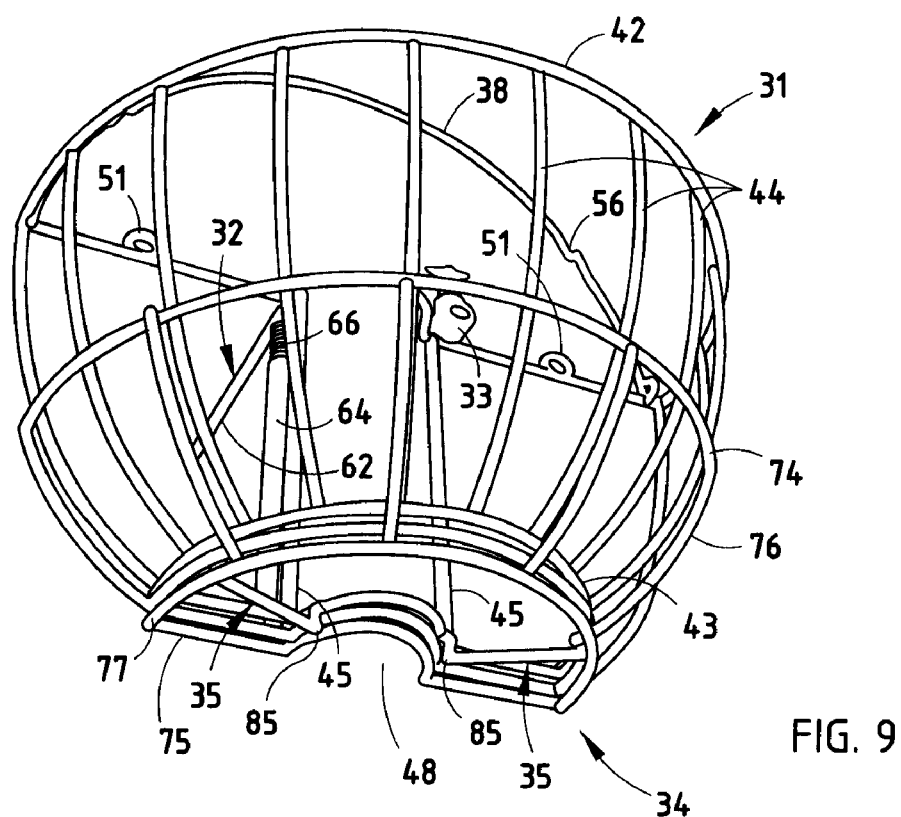
Figure 19:
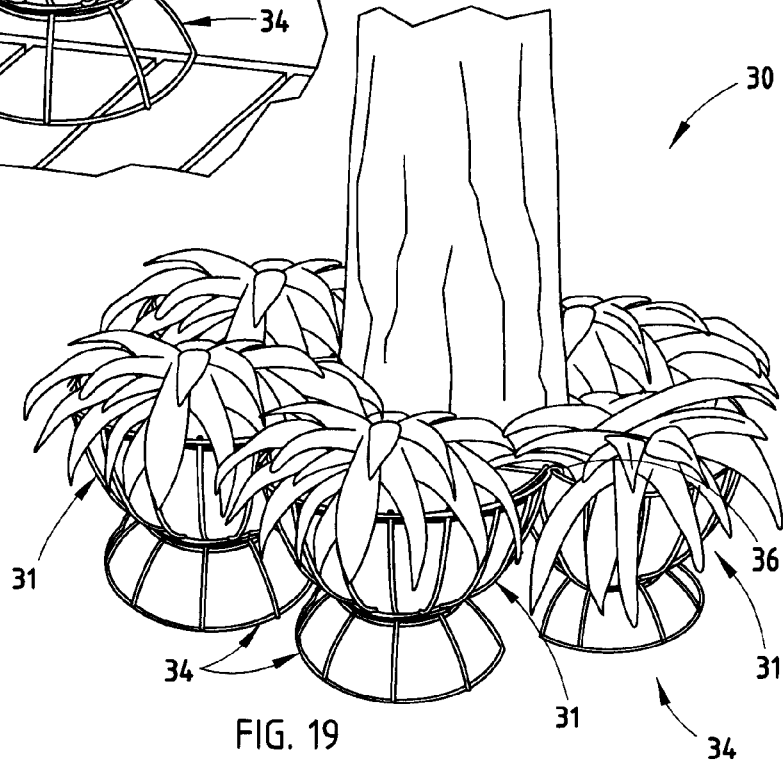
FIG. 19 shows a plurality of present planters attached together in a ring around a tree trunk.

A planter system 30 (FIG. 1) includes a pair of C-shaped wire baskets or plant holders 31 held together with connecting rods 32. The rods 32 are L-shaped, and each is rotatable between a storage position (FIG. 2) tight against their respective basket 31, and a use position (FIGS. 1, 2A and 3–5) where the rods 32 are oriented perpendicularly to telescopingly engage a tube segment 33 on the mating basket 31 (see FIG. 1). A half-saucer-shaped base 34 engages the bottom of each wire basket 31, and can be inverted between a raised basket supporting position (FIG. 8) and a low basket supporting/storage position (FIG. 9). Connectors 35 on the basket 31 snap-attach to the base 34 in both the raised and lowered positions. One corner of the basket 31 (FIG. 2) has a hook 36 shaped to engage a recess 37 in another corner of the basket 31, such that several baskets 31 can be interconnected to form a ring (FIG. 19). An arching handle 38 is provided that pivots down for storage (FIG. 2) and pivots up to a use position (FIG. 1) where it overlappingly frictionally engages the handle 38 of an adjacent identical basket 31 to hold it in an upright position with the two baskets 31 symmetrically positioned underneath.

Figure 15:
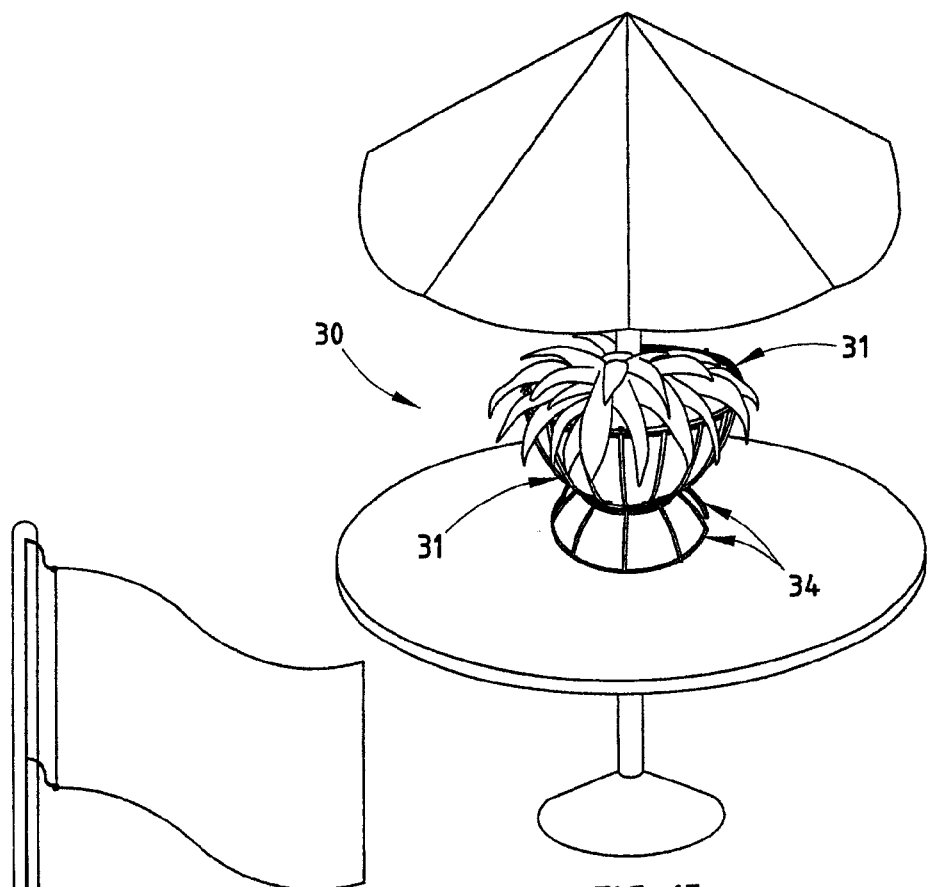
FIG. 15 is a perspective view showing the present planter arrangement with a pair of baskets and bases positioned around an umbrella post on a table.

The wire basket 31 defines a half of a semi-spherical shape that is C-shaped in top view (FIG. 5) and that has a flat inner wall 40 and a curved outer wall 41. The illustrated basket 31 defines half of a cup shape (i.e. one-quarter of a sphere). However, it is contemplated that different basket shapes are within a scope of the present invention, and can use various aspects of the present invention. The illustrated basket 31 includes a top loop 42 and a bottom loop 43, both of which are basically C-shaped, but with the top loop 42 being substantially larger than the bottom loop 43. A plurality of vertical curvilinear wire segments 44 extend between the top loop 42 and the bottom loop 43 to form the outer wall 41. Further, a plurality of straight vertical wire segments 45 (FIG. 4) extend between the top and bottom loops 42 and 43 to form the flat inner wall 40. An additional intermediate horizontal loop can be optionally added to stabilize the wire segments 44 and/or 45, if desired. Notably, the top and bottom loops 42 and 43 each include an arcuate middle section, when the handle 38 is in a downward storage position, that define a vertically-open seri-cylindrical recessed area 48 in the flat inner wall 40. The recessed area 48 is shaped for receiving a post or similar upright elongated beam (see FIGS. 15–16). A thin-walled liner 50 (FIG. 1) is shaped to slip downwardly through the top loop 42 into the space defined between the flat wall 40, the curved wall 41, and above the bottom loop 43. The liner can be made of a variety of materials, including plastic, fiber, and burlap. In particular, the illustrated liner is made of a water retaining plastic film that is flexible, such as is commonly used in the planter industry.

Figure 20:
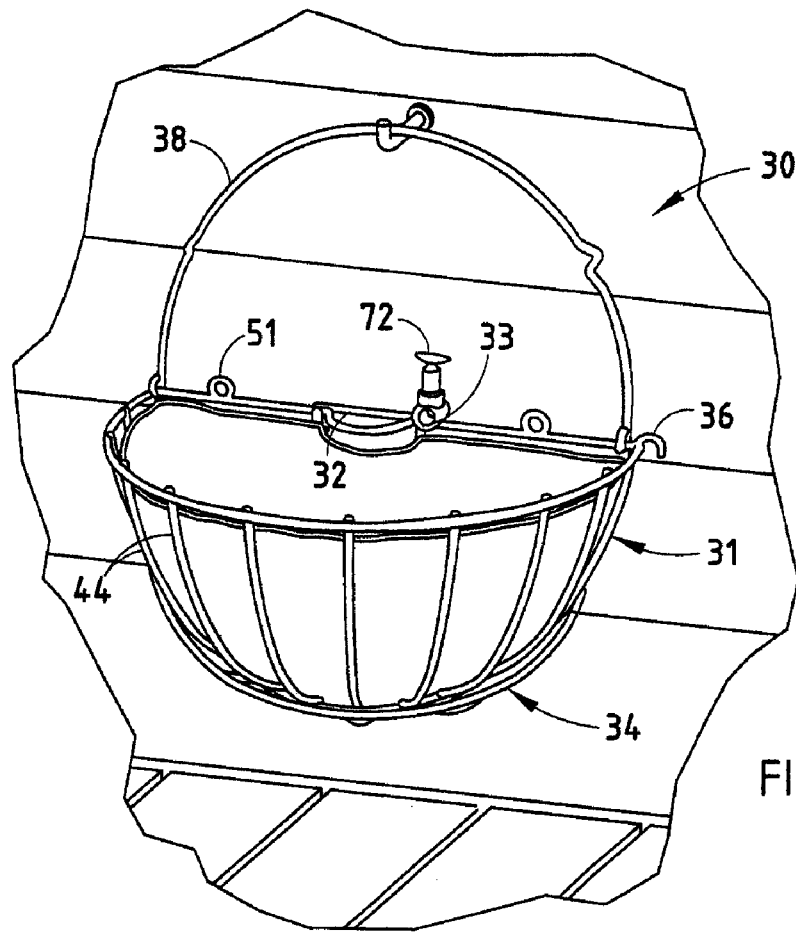
FIG. 20 shows the present planter hung by its handle on a bracket against a building wall.

The present basket 31 (FIG. 1) includes a variety of components and features that make it particularly flexible and adaptable for different arrangements and for meeting the needs of various design arrangements. A pair of washer-shaped loops 51 are attached to the top loop 42 along flat inner wall 40. The washer-like loops 51 are oriented so that a screw can be extended through the washers into a building wall or the like. (See FIG. 21.) A hook 36 is attached to an outer corner 52 (FIG. 2). An opposite outer corner 53 at the other end of the flat inner wall 40 defines a concave recess 37 on the inside concave area of the corner 53 for receiving the hook 36. By attaching the hook 36 on one basket 31 to an adjacent recess 37 on an adjacent basket 31, the baskets can be attached together to form a circular pattern around a tree trunk (see FIG. 20). Also, it is noted that the hooking arrangement of items 36/37 are able to be interconnected at various different angles such that more or less baskets 31 can be added to the ring and/or the baskets can be attached together in a linear or curvilinear row (i.e. not necessarily in a ring).

Figure 18:
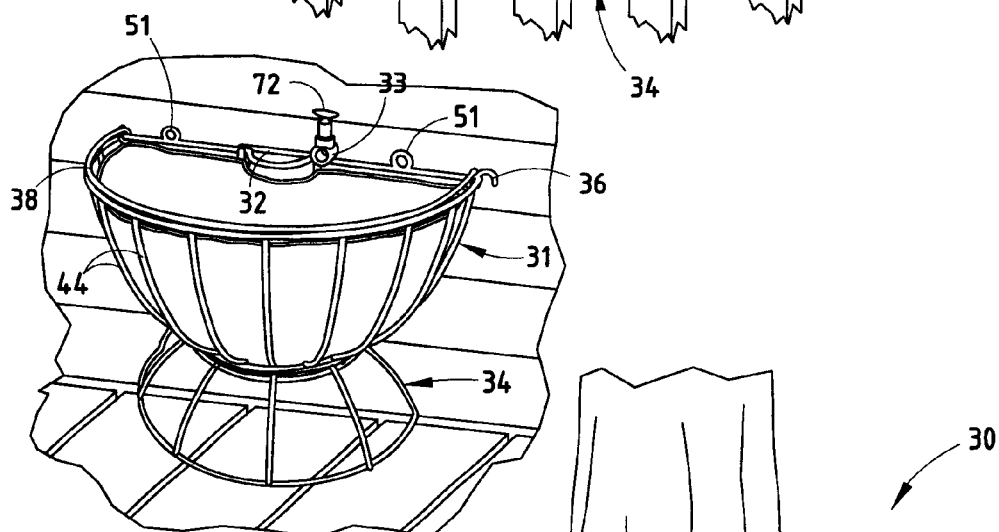
FIG. 18 shows the present planter as a single basket in a freestanding position against a building wall, the basket being supported in a raised position by its base.

The handle 38 (FIG. 2) of each basket 31 includes a first end 38' bent in a loop around the top loop 42 on flat inner wall 40 adjacent the outer corner 52, and the other end of the handle 38 includes a second loop 38' bent around the top loop 42 of flat inner wall 40 at the corner 53. The handle 38 is arcuately shaped and pivotable between a lowered horizontal position (see FIGS. 2, 18, and 21), and a raised position (see FIGS. 1, 2A and 20). The handle 38 includes offset bends 56 and 57 about halfway up its length on each side. The offset bends 56 and 57 are slightly different from each other and are designed to overlappingly frictionally engage when a first basket 31 is positioned with its flat inner wall 40 against an identical basket 31 (see FIG. 1). In this abutting mating condition, with the handles 38 in a raised position, the right loop offset bend 56 overlappingly engages and frictionally engages the mating offset bend 57 to hold the handles in an upright latched position.

Figure 2A:
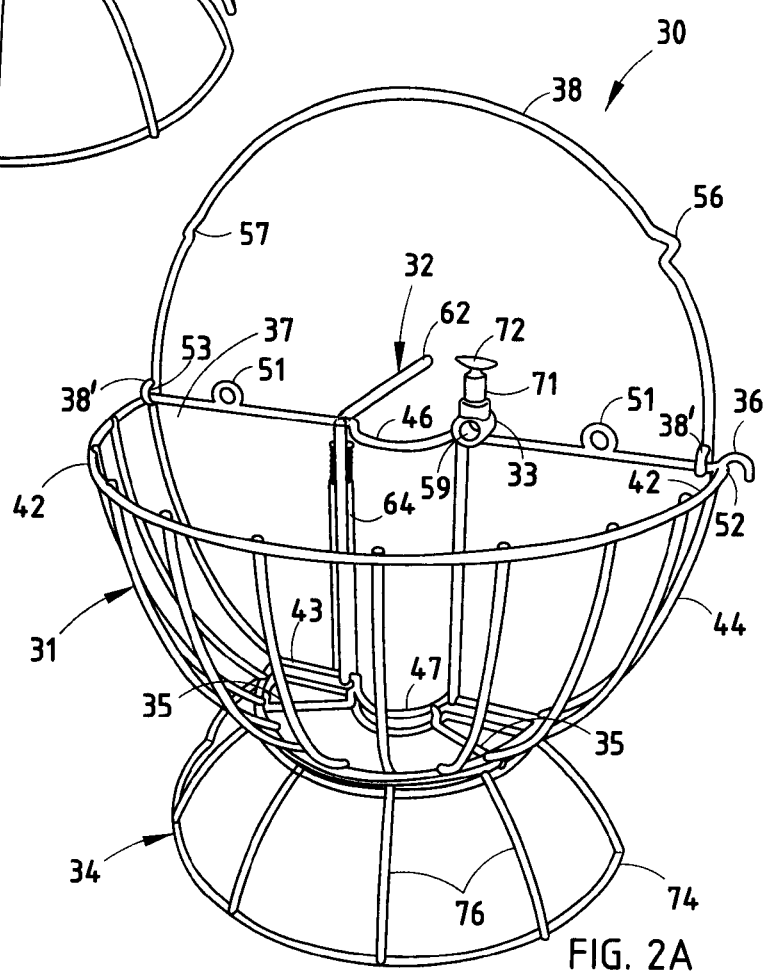
FIGS. 2 and 2A are perspective views of one of the baskets shown in FIG. 1, FIG. 2 showing a handle in a lowered storage position and the rod in a collapsed storage position, and FIG. 2A showing the handle pivoted to a raised use position and the rod rotated to an outwardly extending use position.
Figure 11:
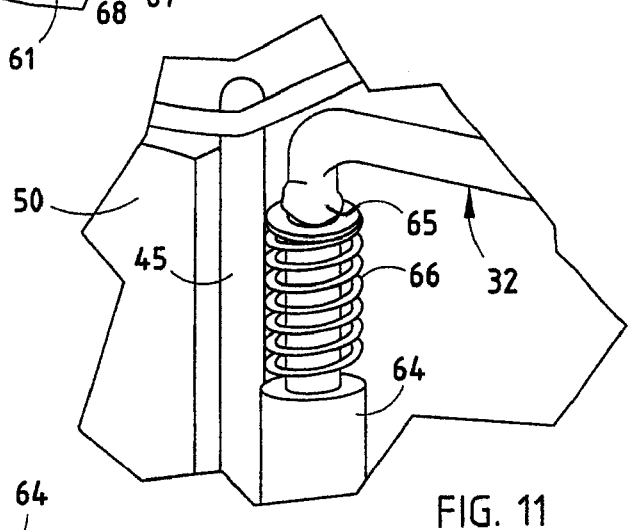
FIG. 11 is an enlarged view of a top of the rod in FIG. 10.
Figure 12:
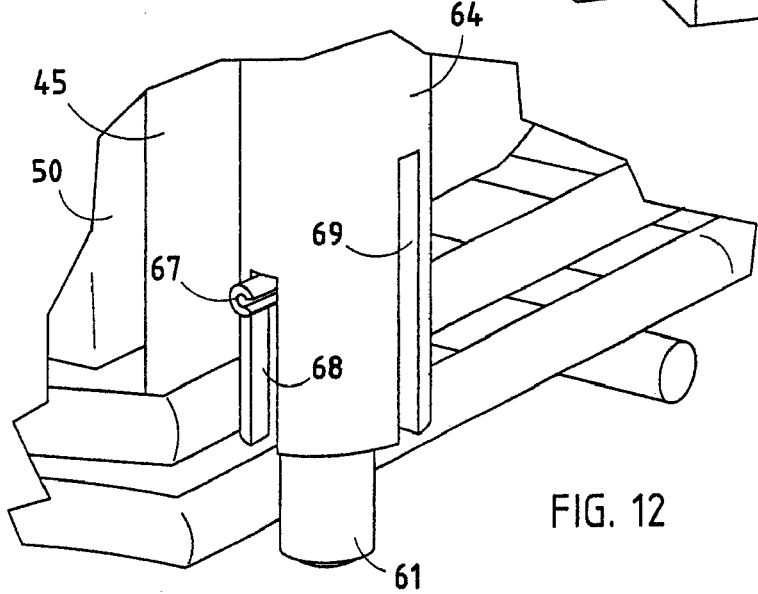
FIG. 12 is an enlarged view of a bottom of the rod in FIG. 10, with the rod being in a storage position adjacent the basket.

The tube section 33 (FIG. 2) is attached to the top loop 42 of each basket 31 outboard of but adjacent the arcuate section 46. The tube section 33 includes a bore 59 that extends perpendicular to the flat inner wall 40. The flat inner wall 40 defines a vertical plane, and the L-shaped rod 32 includes a vertical leg 61 in the plane and a horizontal leg 62 that is stored in the plane (FIG. 2) but is movable to extend perpendicularly to the plane (FIG. 2A). A second tube section 64 is attached to the top and bottom loops 42 and 43 (FIG. 2) on the flat inner wall in a vertical position adjacent the arcuate section 46 on an opposite side of the arcuate section 46 from the tube section 33. The vertical leg 61 of the L-shaped rod 32 extends down into the tube section 64 and rotatably engages the same. The vertical leg 61 includes a flattened section 65 (FIG. 11). During assembly, a coil spring 66 is positioned on the vertical leg 61 under the flattened section 65 and on top of the second tube section 64. The vertical leg 61 is extended down through the tube section 64 and includes a hole in which a hardened pin 67 (FIG. 12) is driven into the hole at the bottom of the tube section 64. A bottom end of the tube section 64 includes a pair of short slots 68 that are 180° apart, and further includes a pair of long slots 69 that are 180° from each other and 90° from the short slots 68.

Figure 10:
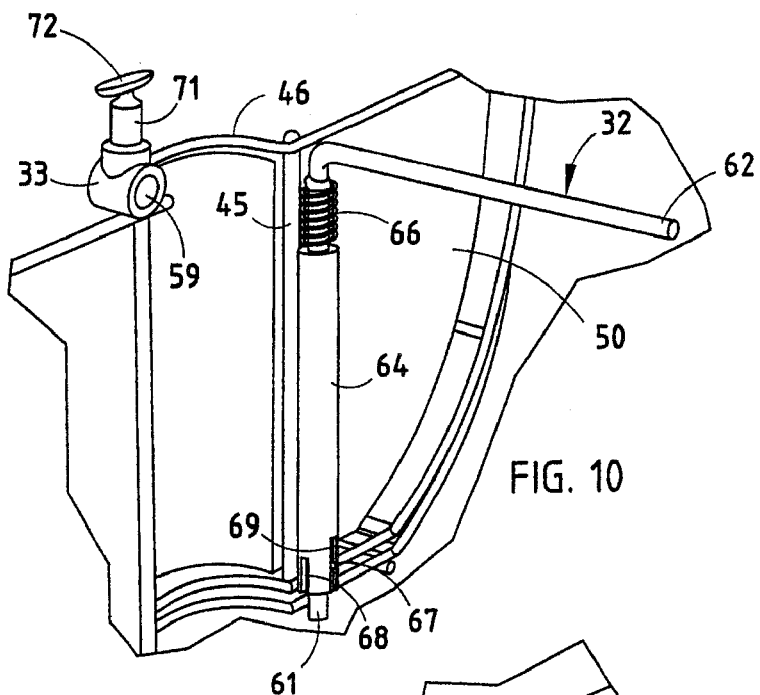
FIG. 10 is a fragmentary perspective view of the L-shaped rod and pivot tube, with the rod in a perpendicularly-extended use position.
Figure 13:
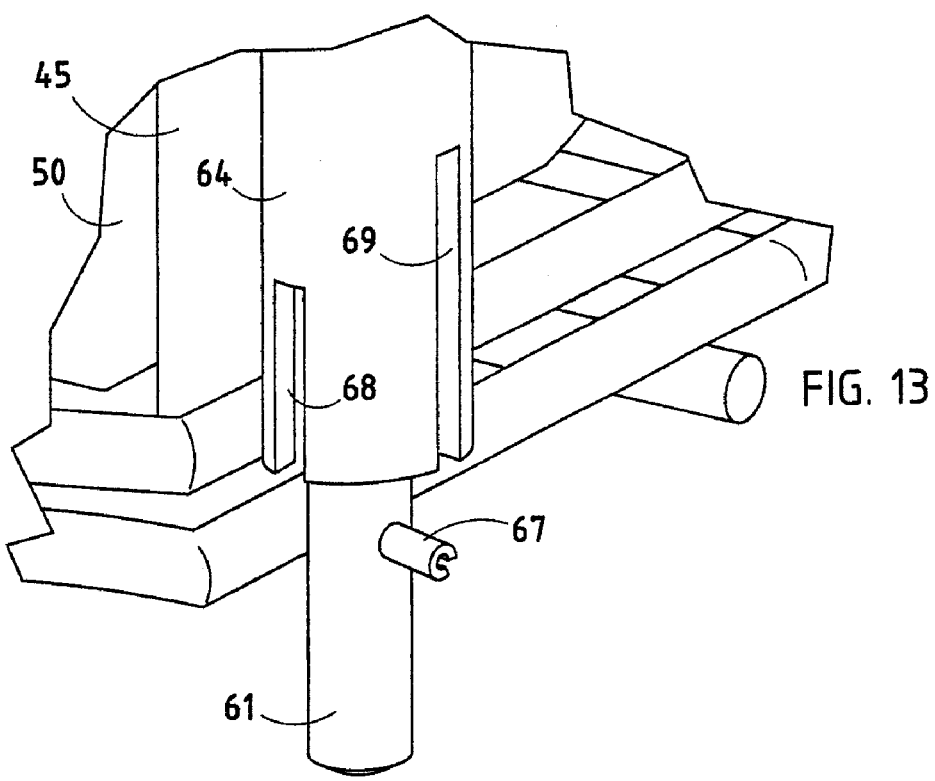
FIG. 13 is a view similar to FIG. 12, but showing the rod moved downwardly to a released position where it can be rotated between the storage position (FIG. 12) and the perpendicularly-extended use position (FIGS. 14 and 10)
Figure 14:
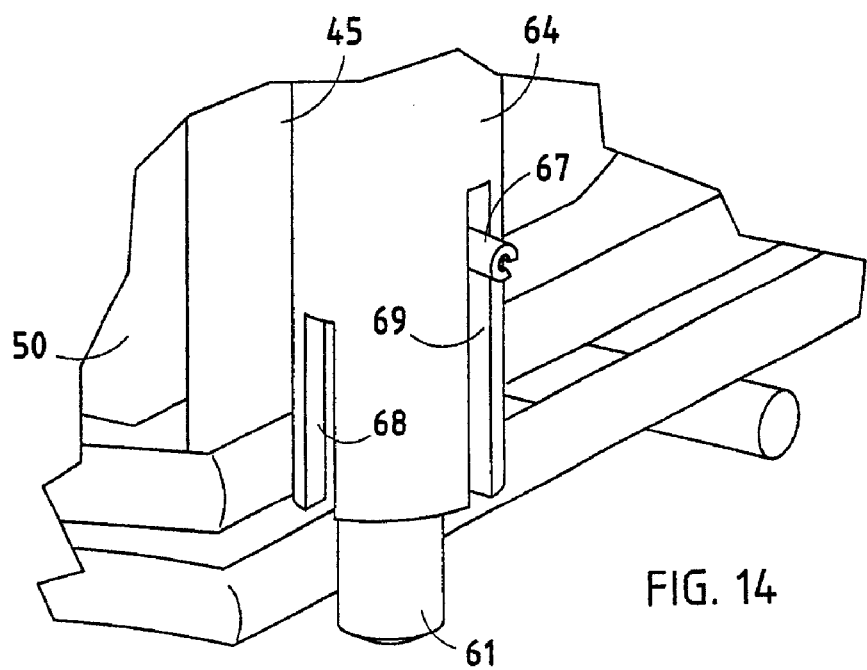
FIG. 14 is a view similar to FIG. 12, but showing the rod rotated to its perpendicularly-extended use position (see FIG. 10)

When the hardened pin 67 is positioned in the short slots 68, the horizontal leg 62 of the L-shaped rod 32 extends parallel the flat inner wall 40 and is positioned generally in the same horizontal plane as the top loop 42 (with the horizontal leg 62 extending under a nose of the tube section 33). When the L-shaped rod 32 is depressed downwardly, the coil spring 66 is compressed (FIG. 13), and the hardened pin 67 is moved out of the short slot 68 to a location below the short slot 68. The horizontal leg 62 can then be rotated where it extends perpendicular to the flat inner wall 40 (FIG. 10 and 13). When the L-shaped rod 32 is released and the coil spring 66 decompresses, the hardened pin 67 extends into the long slot 69 (FIGS. 10 and 14), thus retaining the horizontal leg 62 in the perpendicular extending position. (See also FIG. 1.) An end of the long slot 69 (FIGS. 12 and 14) is higher than an end of the short slot 68, such that the hardened pin 67 slides upwardly to allow the horizontal leg 62 to be positioned in alignment with a hole through the tube section 33 when in its extended use position, but so that the horizontal leg 62 is positioned to slip under the tube section 33 when in its storage position.

Figure 1:
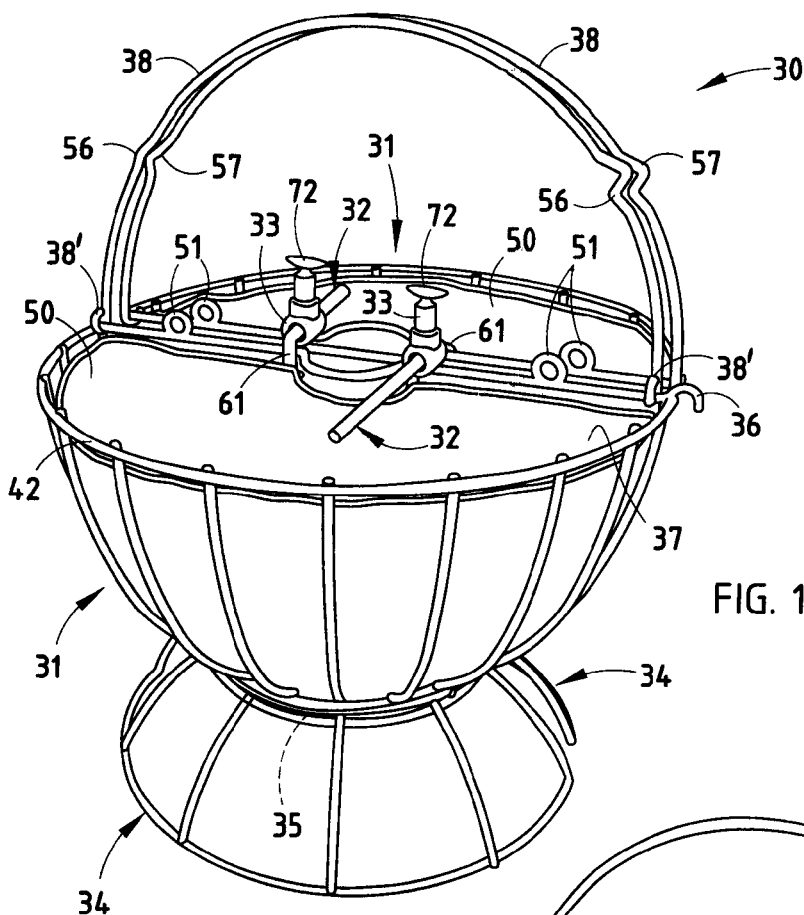
FIG. 1 is a perspective view of a planter system embodying the present invention including a pair of baskets support in a raised position by associated bases.
Figure 2:
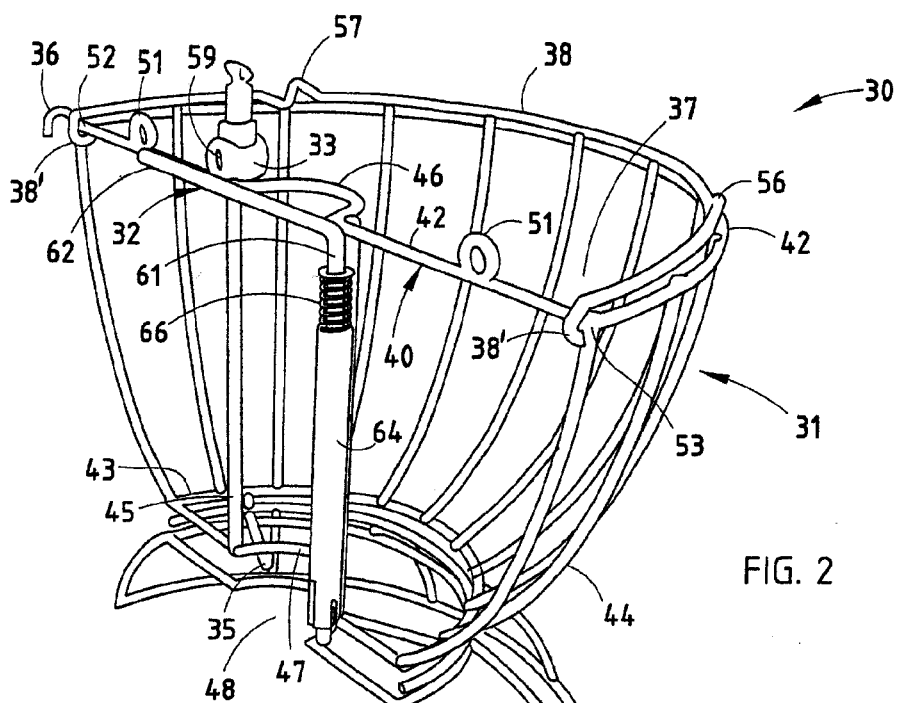
Figure 3:
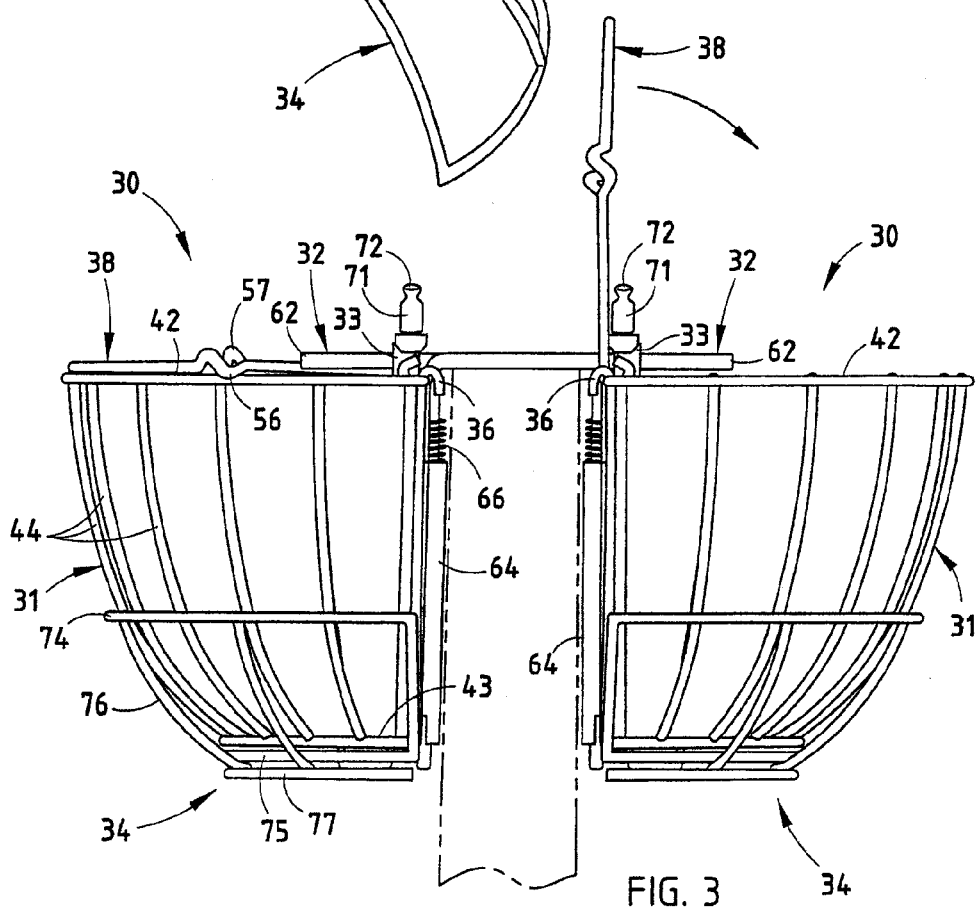
Figure 4:
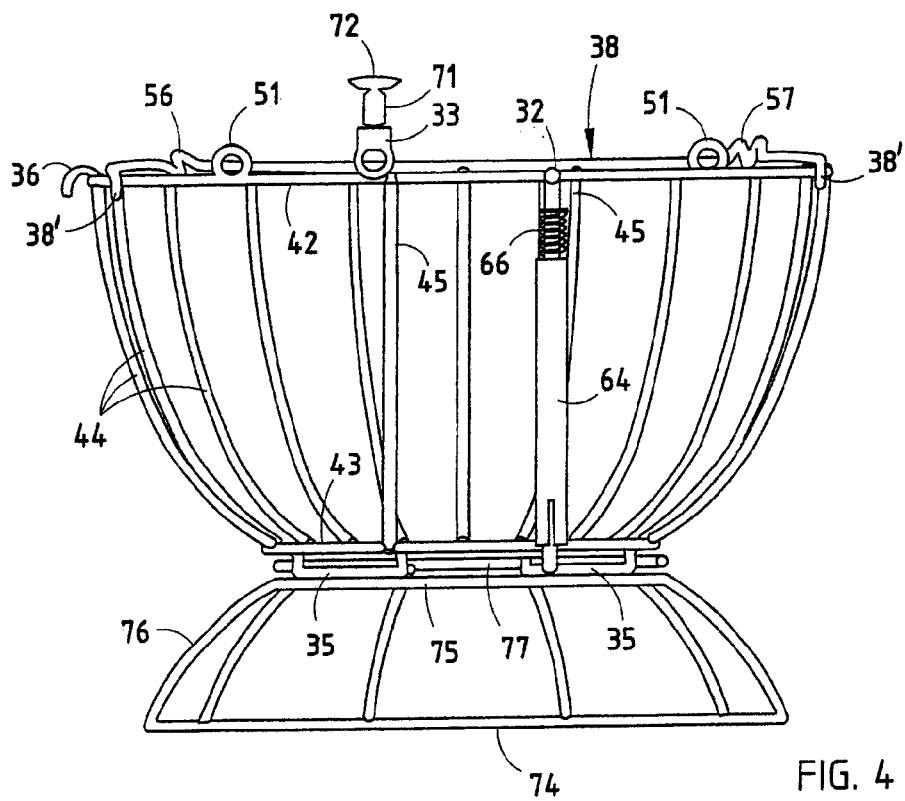
FIGS. 4 and 5 are front and top views of the basket and base shown in FIG. 2, the handle being shown as lowered in a storage position in FIG. 4 and raised in FIG. 5.
Figure 5:
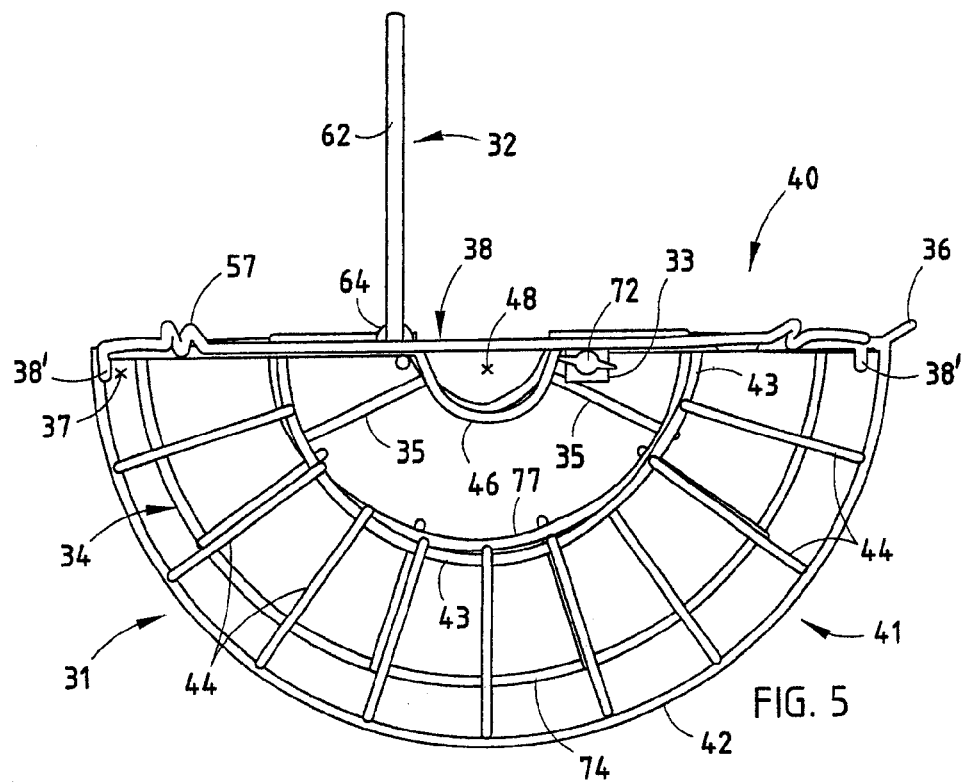

As shown in FIGS. 1 and 3, a pair of the baskets 31 can be connected together with the horizontal legs 62 of each respective associated L-shaped rods 32 engaging the tube section 33 on the mating basket 31. A set screw 71 includes thumb tabs 72 so that a person can manually rotate the screw 71 down into the threaded hole in the tube section 33 into clamping engagement against the horizontal leg 62, thus fastening the baskets 31 together at a selected spacing. For example, the baskets can be held tight together (see FIG. 1), or spaced apart such as for hanging on a deck railing (see FIG. 17).

Figure 7:
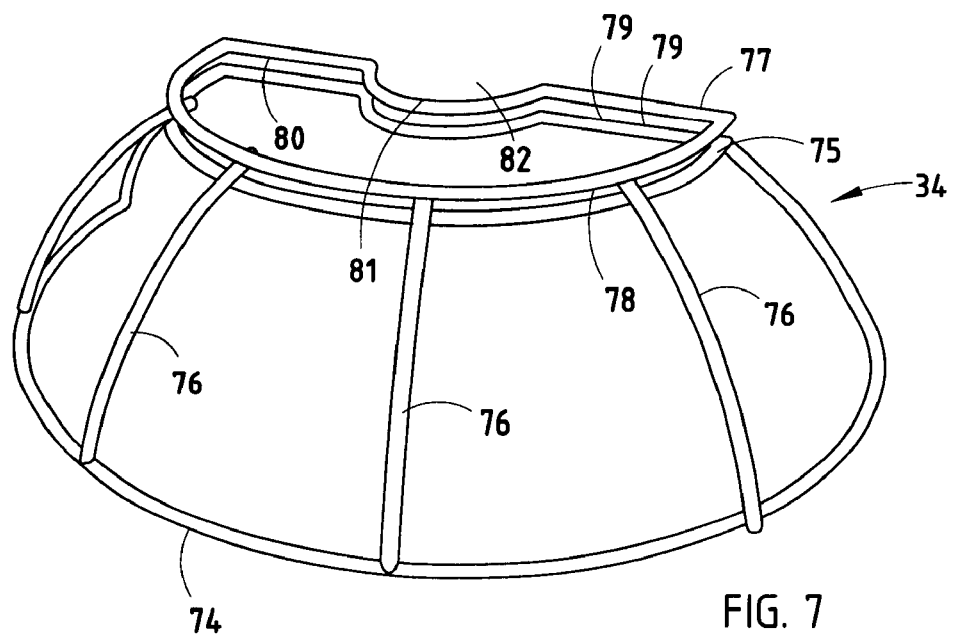
FIG. 7 is a top perspective view of the base shown in FIG. 3.

The base 34 (FIG. 7) is shaped to mateably engage a bottom of one of the baskets 31 and is further shaped to matingly abut another base 34 as follows. The base 34 includes a large C-shaped partial loop 74, a small C-shaped loop 75, and a plurality of arcuate vertical sections 76 connecting the large and small loops 74 and 75. A second loop 77 having an identical shape to loop 75 is positioned adjacent loop 75 with a small space 78 therebetween. The small C-shaped loops 75 and 77 each include aligned linear sections 79 and 80 and include an arcuate section 81 connecting the linear sections 79 and 80. The arcuate section 81 forms a cavity 82 that aligns with the arcuate sections 46 and 47 in the basket 31, and can be used, for example, to receive a post or tree trunk. (See FIGS. 15 and 16.) The loops 74, 75, 77, and vertical rod 76 define a half-cup-shaped concave cavity that fits mateably up against a bottom of the basket 31 as follows.

Figure 6:
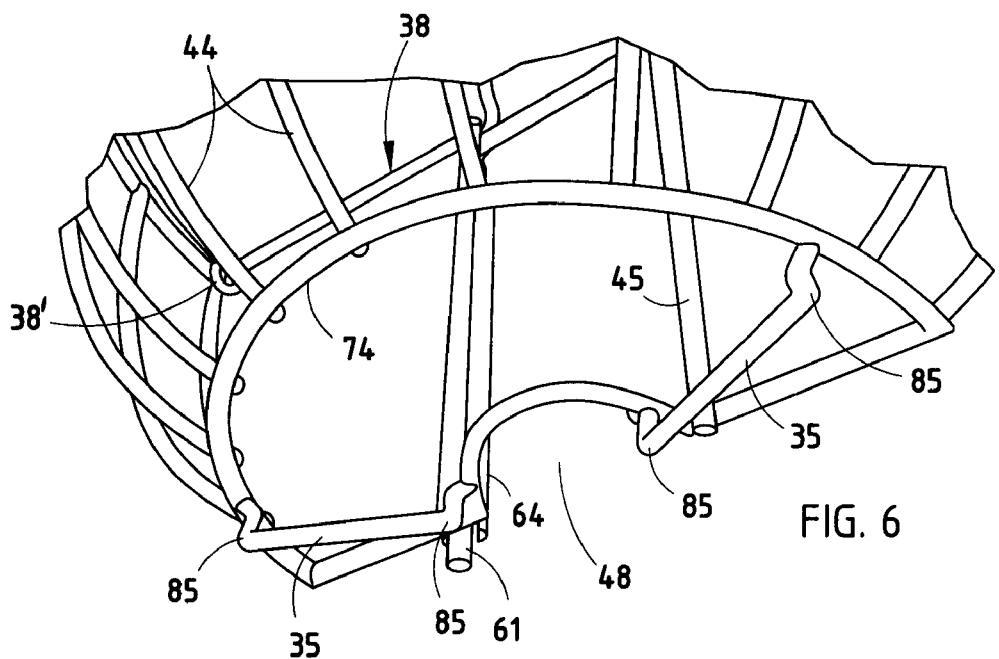
FIG. 6 is a bottom fragmentary perspective view of the basket shown in FIG. 3, the base being removed to better show the bottom.

The bottom of the basket 31 (FIG. 6) includes a pair of bent-wire retainers 35. The retainers have opposing nose protrusions 85 (FIG. 9) that face in opposite directions and that are shaped to snappingly fit within the space 78 between the small loops 75 and 77. The retainers further include a section of wire that spaces the nose protrusions 85 apart, and further, the nose protrusions 85 are radiused, such that the connection is positive but able to be consistently and easily made by a user. Two retainers 35 are illustrated at an angular position of about 120° to 140° apart, but it is noted that additional wire retainers can be utilized, if desired. The base 34 can be attached to a bottom of the basket 31 in a dense storage position (FIG. 9) with the base forming a saucer-like arrangement with the basket 31, thus holding the basket in a low position relative to a floor or ground. Alternatively, the base 34 can be inverted to hold the basket in a raised position (see FIGS. 2, 18, and 19).

Figure 16:
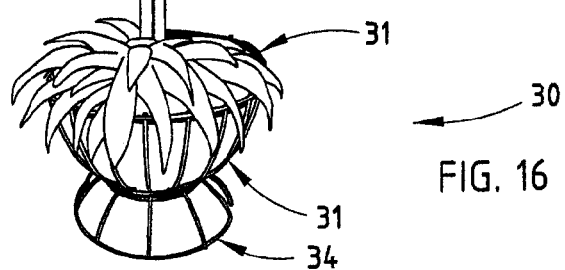
FIG. 16 is a view showing the present planter positioned around a flagpole.
Figure 17:
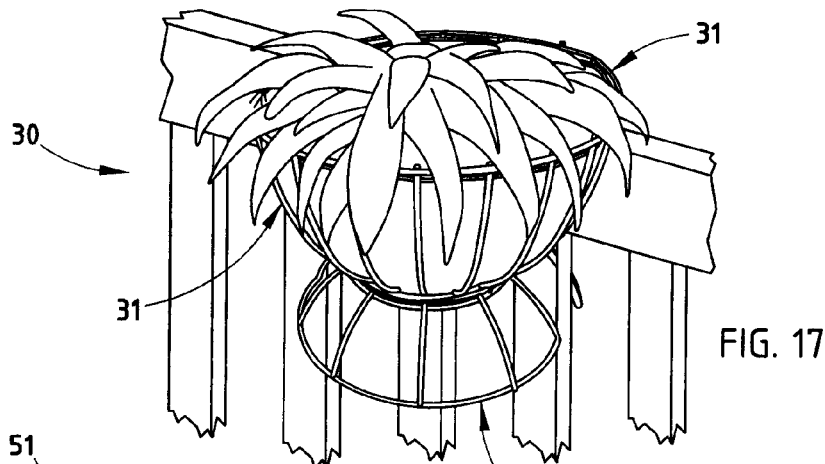
FIG. 17 shows the present planter with a pair of baskets hanging on opposite sides of a deck railing.

It is contemplated that any one or all of the above-identified accessories can be provided on the planter 30. The present planter can be used as a stand-alone circular cup-shaped arrangement (FIG. 1), or can be attached around an umbrella post on a picnic table (FIG. 15), or can be attached around a flagpole on the ground (FIG. 16). Alternatively, the planter 30 can be assembled with the baskets 31 spaced apart with the rods 32 resting on a deck railing with the baskets 31 on each side (FIG. 17). Alternatively, a freestanding basket can be set against a building (FIG. 18), or adjacently attached in a ring around a tree (FIG. 19), or in a row along a linear or non-linear sidewalk or hedge or wall or the like. Alternatively, the basket can be hung with its handle resting on a hook (FIG. 20), or the planter can be attached to a windowsill (FIG. 21).

Advantageously, the present planter 30 is particularly adaptable for a wide range of configurations, all of which are intuitive and relatively easy to arrange. The planter is a one-piece unit with no loose pieces (except for, perhaps, the attachment screws for attaching the unit to a building). The rod connector arrangement including rods 32 that telescopingly engage tube section 33 are held in place by manually-operated thumb setscrews 71 and are particularly easy to orient in storage (FIG. 21) and use (FIG. 1) positions. Further, the baskets 31 can be easily brought together (FIG. 1) or spaced apart (FIG. 17) for use. Advantageously, the base 34 can be positioned in an upwardly open position and mateably engaged against a bottom of the basket 31 without the use of separate fasteners and without the use of separate screws or other members. The base 34 snap-attaches in a dense storage position tight against a bottom of its associated basket 31. This allows a plurality of baskets 31, bases 34, and liners 39 to be stacked in a vertical arrangement of 20 or more high, such that the units can be densely packed for shipping purposes.

Figure 21:
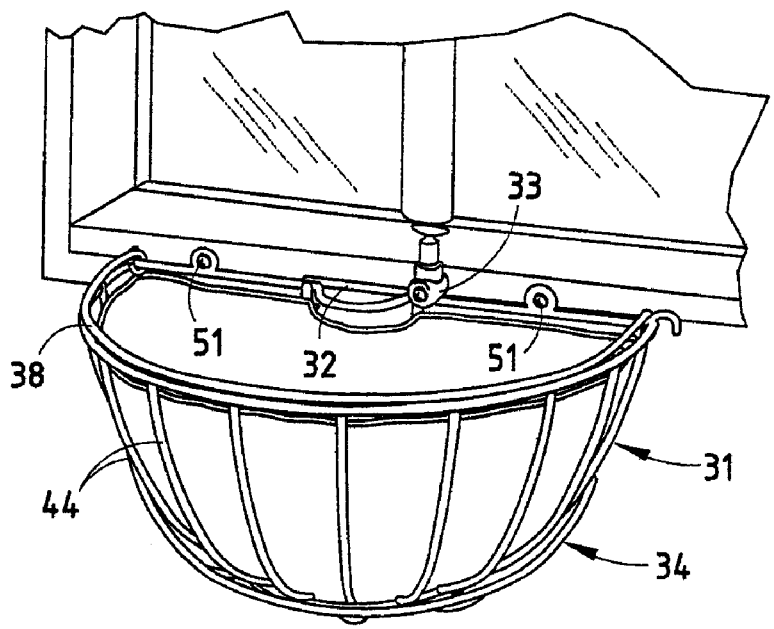
FIG. 21 shows the present planter attached to a window-sill.

To summarize, using the basic planter basket 31 and the base 34, the following arrangements are possible: an urn planter (FIG. 1), patio table planter (FIG. 15), a pole planter (FIG. 16), a rail planter (FIG. 17), a flush-mount planter (FIG. 18), an area planter (FIG. 19), a wall planter (FIG. 20) and a window planter (FIG. 21).

In addition, the appearance and design of the present basket, by itself and/or in combination with the base and with the other features and accessories shown herein, are believed to be novel, ornamental, and unobvious, and hence patentable.

Figure 22:
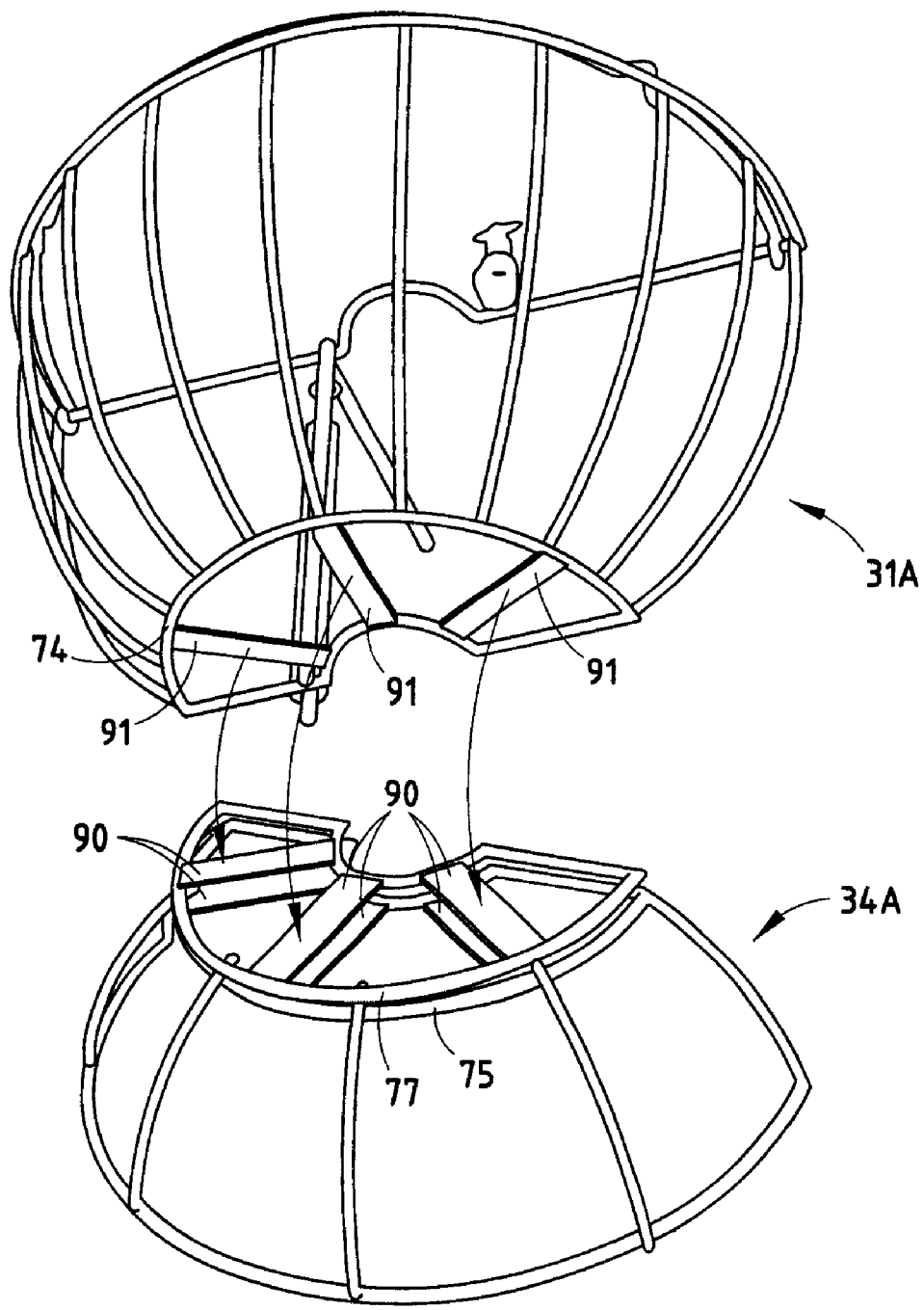
FIG. 22 is an exploded perspective view showing a modified planter having a magnetic bottom-to-base connection arrangement.

It is contemplated that other means can be used to attach the base 34 to the basket 31, such as magnets, Velcro, or other fasteners. For example, in FIG. 22, base 34A includes metal strips 90 attached to one or both of the loops 75 or 77, and basket 31A includes magnets 91 instead of the retainer 35 with nose portions 85. The strips 90 and magnets 91 are positioned so that they engage for magnetic bonding when the base 34A is attached either in the raised position or the lowered storage position on the basket 31A.

Figure 23:
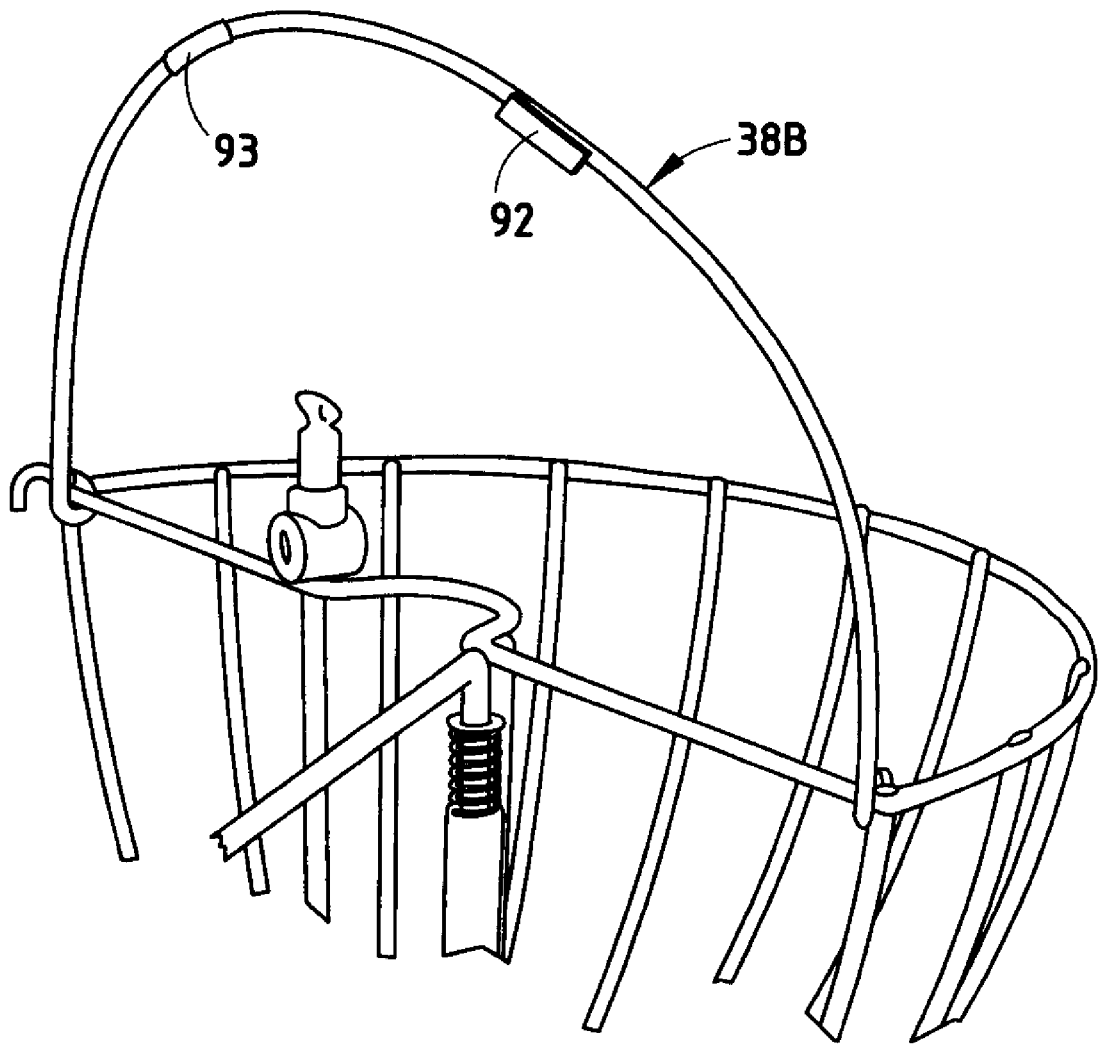
FIG. 23 is a fragmentary perspective view of a planter having a modified handle.

It is also contemplated that magnets, Velcro, or similar fasteners can be used to attach a pair of handles together instead of using the bent portions 56/57. The basket 31B (FIG. 23) includes on its handle 38B, a magnet 92 and a mating flattened/deformed area 93 (or strip) positioned slightly off-center from a top of the handle 38B. The magnet 92 and deformed area 93 are positioned to engage and magnetically bond when a pair of baskets 31B are positioned together. (See FIG. 1.)

In the foregoing description, it will be readily appreciated by persons skilled in the art that modifications may be made to the invention without departing from the concepts disclosed herein. Such modifications are to be considered as included in the following claims, unless these claims by their language expressly state otherwise.

The invention claimed is:

1. A planter comprising:
a pair of wire baskets each having interconnected wire segments defining a wall, and each having a tube section attached to the wire segments near a top of the wall;
each of the pair of baskets having a non-threaded rod telescopingly extending into the tube section of the other basket; and
a fastener comprising a setscrew on the tube section for retaining the associated non-threaded rod at a selected telescoped position to maintain a selected spacing of the pair of baskets.

2. A planter comprising:
a pair of wire baskets each having interconnected wire segments defining a wall, and each having a tube section attached to the wire segments near a top of the wall;
each of the pair of baskets having a rod telescopingly extending into the tube section of the other basket; and
a fastener on the tube section for retaining the associated rod at a selected telescopes position to maintain a selected spacing of the pair of baskets wherein each of the rods are L-shaped, and wherein each rod on an associated one of the baskets includes a horizontally extending leg that telescopingly engages a hole in the tube section of the other basket, and further includes a vertical leg section coupled to the associated wire basket.

3. The planter defined in claim 2, wherein each of the wire baskets includes a second tube oriented vertically that rotatably supports and engages a vertical leg of the associated rod.

4. The planter defined in claim 3, wherein the rod is supported in the second tube for vertical movement so that the horizontal leg can be positioned at a first height for fitting under the first-mentioned tube section and can be positioned at a second height for use that is in horizontal alignment with the bore of the first-mentioned tube section.

5. The planter defined in claim 4, including a spring mounted on the vertical leg of the rod for biasing the rod to a raised position, but the rod including a pin in a lower end of the vertical leg for retaining the rod in the second tube.

6. The planter defined in claim 5, including a liner positioned in each of the wire baskets for holding soil and roots of a plant.

7. The planter defined in claim 5, wherein the fastener includes a thumbscrew.

8. A planter comprising:
a pair of wire baskets each having interconnected wire segments defining a wall, and each having a tube section attached to the wire segments near a top of the wall;
each of the pair of baskets having a rod telescopingly extending into the tube section of the other basket; and
a fastener on the tube section for retaining the associated rod at a selected telescoped position to maintain a selected spacing of the pair of baskets wherein the rod includes a horizontal leg and a vertical leg, and the rod is movable to a storage position where the horizontal leg fits under the tube section and the horizontal leg, when in a use position, extends perpendicularly to a flat wall on the wire baskets into a bore of the tube section for telescoping engagement.

9. A planter comprising:
a pair of wire baskets each having interconnected wire segments defining a wall, and each having a tube section attached to the wire segments near a top of the wall;
each of the pair of baskets having a rod telescopingly extending into the tube section of the other basket; and
a fastener on the tube section for retaining the associated rod at a selected telescoped position to maintain a selected spacing of the pair of baskets including a base shaped to mateably engage a bottom of each of the pair of wire baskets, the base being three-dimensional and configured to engage the bottom of the wire baskets to support the baskets low to a floor support surface and the base being invertible to hold the baskets in a raised position.

10. A planter comprising:
a pair of wire baskets each having interconnected wire segments defining a wall, and each having a tube section attached to the wire segments near a top of the wall;
each of the pair of baskets having a rod telescopingly extending into the tube section of the other basket; and
a fastener on the tube section for retaining the associated rod at a selected telescoped position to maintain a selected spacing of the pair of baskets wherein the baskets have a bottom with a connector for snappingly engaging the base in either the first position or inverted raised position.

11. The planter defined in claim 10, wherein the baskets have vertical wire sections that define a half of a cup shape.

12. A planter comprising:
a pair of wire baskets each having interconnected wire segments defining a wall, and each having a tube section attached to the wire segments near a top of the wall;
each of the pair of baskets having a rod telescopingly extending into the tube section of the other basket; and
a fastener on the tube section for retaining the associated rod at a selected telescoped position to maintain a selected spacing of the pair of baskets wherein the wire baskets each have a flat wall with a vertically open half-cylinder-shaped centered space for receiving and engaging a post.

13. A planter comprising:
a pair of wire baskets each having interconnected wire segments defining a wall, and each having a tube section attached to the wire segments near a top of the wall;
each of the pair of baskets having a rod telescopingly extending into the tube section of the other basket; and
a fastener on the tube section for retaining the associated rod at a selected telescoped position to maintain a selected spacing of the pair of baskets including handles on each wire basket, the handles being pivotable between a horizontal storage position and an upright use position, the handles including a zigzag bend adapted to overlappingly and frictionally engage when the handles are positioned in an upright use position on a pair of wire baskets that are interconnected tight together.

14. A planter comprising:
a pair of plant holders each having a wall with a vertically-open area for receiving a post in a center of the wall, and each having a connector offset from the center of the wall;
each of the pair of plant holders having a rod offset from the center of the wall in a direction opposite the connector; and
a clamp for clampingly retaining the rod from one plant holder to the connector of the other plant holder at a selected telescoped position to maintain a selected spacing of the pair of plant holders, with the rod associated with each of the plant holders being spaced from the rod associated with the other wire basket such that the pair of plant holders can be positioned around the post and also can be positioned on opposite sides of a railing.

15. The planter defined in claim 14, wherein the clamp includes a threaded fastener.

16. The planter defined in claim 14, wherein the clamp includes a tube section with a hole for telescopingly receiving the rod.

17. The planter defined in claim 14, wherein the clamp includes a setscrew.

18. A planter comprising:
a basket having first wire segments defining a bottom and defining a space for retaining a potted plant;
a concave base having second wire segments defining a support area; and
at least one connector on the basket shaped to releasably engage the second wire segments and hold the bottom of the basket to the support area of the base both when the base is in a first position where the support area is adjacent a floor surface and also when the base is in an inverted second position where the support area is spaced above the floor surface wherein the connector comprises a bent wire.

19. A planter comprising:
a basket having first wire segments defining a bottom and defining a space for retaining a potted plant;
a concave base having second wire segments defining a support area; and
at least one connector on the basket shaped to releasably engage the second wire segments and hold the bottom of the basket to the support area of the base both when the base is in a first position where the support area is adjacent a floor surface and also when the base is in an inverted second position where the support area is spaced above the floor surface wherein the first wire segments include parallel top and bottom first wire segments that define a space therebetween and the at least one connector has opposing nose sections for engaging the space.

20. A planter system comprising:
a plurality of identical planters each having a wall defining a space for holding a potted plant, the wall defining a geometric shape with first and second outer corners, the first outer corner having a first connector and the second outer corner having a second connector for engaging the first connector in an arrangement where the first outer corner of one planter is held closely adjacent to the second outer corner of another planter but where the interconnected first and second connectors permit a wide range of angles between the closely adjacent planters, whereby the planters can be interconnected to make rings and shapes around an obstacle wherein the first connector comprises a hook and the second connector comprises a recess for receiving the hook.

21. A planter system comprising:
a plurality of identical planters each having a wall defining a space for holding a potted plant, the wall defining a geometric shape with first and second outer corners, the first outer corner having a first connector and the second outer corner having a second connector for engaging the first connector in an arrangement where the first outer corner of one planter is held closely adjacent to the second outer corner of another planter but where the interconnected first and second connectors permit a wide range of angles between the closely adjacent planters, whereby the planters can be interconnected to make rings and shapes around an obstacle wherein the first connector comprises a magnet and the second connector comprises a magnetically attractive metal strip for engaging the magnet.

22. A planter comprising:
a planter having a wall defining an enclosed area for a plant; and
an L-shaped connector with a first leg coupled to the wall for rotation so that, as the first leg is rotated, a second leg is moved between a storage position where the second leg does not protrude from the planter, and an extended use position where the second leg extends away from the wall for connection to another planter.

23. The planter defined in claim 22, wherein the planter includes a tube section shaped and oriented to telescopingly receive the second leg when in the extended use position.

24. The planter defined in claim 22, wherein the planter includes a tube section for receiving the second leg of an identical adjacent planter, the tube section including a setscrew to retain the second leg in the selected telescoped position.

25. A planter comprising:

first and second baskets each including a flat wall defining a plane, the first and second baskets being shaped for positioning together to form an arrangement having the appearance of a single basket and having connectors for holding the first and second baskets together; the first basket having a first handle with first ends attached to the first basket and a first arching portion, and the second basket having a second handle with second ends attached to the second basket and a second arching portion, the first and second handles each being movable between a horizontal storage position perpendicular to the plane and an upright use position extending parallel the plane, the first and second arching portions having first and second bends, respectively, that extend non-parallel the plane and that overlap and frictionally engage when the first and second handles are in the use positions when the first and second baskets are connected together.

26. A planter comprising:

a first basket having a flat wall;

first connectors on the flat wall for connecting the first basket to a building wall;

second connectors on the flat wall for connecting the first basket to another identical basket with the flat wall abutting a flat wall on the identical basket;

third and fourth connectors near ends of the flat wall for connecting the first basket to other identical baskets to create a ring of interconnected planters.

27. The planter defined in claim 26, including a base shaped to mateably engage a bottom of the first basket.

28. The planter defined in claim 26, including a storable handle attached to a top of the first basket.

29. The planter defined in claim 26, including connecting rods that are movable to a storage position where the rods do not protrude from a basket, and movable to a use position where they extend from the first basket for telescoping engagement with a tube section on an adjacent basket.

* * * * *